United States Patent [19]

Wheatley et al.

[11] Patent Number: 5,278,694
[45] Date of Patent: Jan. 11, 1994

[54] OPTICALLY DISSIMILAR COMPOSITION FOR POLYMERIC REFLECTIVE BODIES

[75] Inventors: John A. Wheatley; Walter J. Schrenk; Stephen E. Bales; Mark A. Barger; Charles A. Langhoff; Ravi Ramanathan, all of Midland, Mich.

[73] Assignee: The Dow Chemical Company, Midland, Mich.

[21] Appl. No.: 702,652

[22] Filed: May 17, 1991

Related U.S. Application Data

[63] Continuation-in-part of Ser. No. 466,168, Jan. 17, 1990, Pat. No. 5,122,906, and a continuation-in-part of Ser. No. 463,645, Jan. 11, 1990, Pat. No. 5,122,905.

[51] Int. Cl.$^5$ .............................. F21V 9/04; G02B 5/28
[52] U.S. Cl. .................................... 359/359; 359/586; 359/589
[58] Field of Search ............... 359/350, 352, 359–361; 577, 584–590, 500; 883, 884; 428/131, 156, 212–215; 423.1, 480, 913

[56] References Cited

U.S. PATENT DOCUMENTS

| | | | |
|---|---|---|---|
| 3,560,076 | 2/1971 | Ceppi .................................. | 359/491 |
| 3,711,176 | 1/1973 | Alfrey, Jr. et al. .................. | 359/359 |
| 3,759,647 | 9/1973 | Schrenk et al. .................... | 425/133.5 |
| 3,773,882 | 11/1973 | Schrenk ............................. | 264/171 |
| 3,884,606 | 5/1975 | Schrenk ............................. | 425/133.5 |
| 4,310,584 | 1/1982 | Cooper .............................. | 428/212 |
| 4,430,485 | 2/1984 | Mark ................................. | 525/439 |
| 4,540,623 | 9/1985 | Im et al. ............................ | 428/220 |
| 4,652,607 | 3/1987 | Stix et al. .......................... | 525/67 |
| 4,710,534 | 12/1987 | Liu ................................... | 524/411 |
| 4,788,276 | 11/1988 | Mark et al. ........................ | 528/179 |
| 4,806,289 | 2/1989 | Laursen et al. .................... | 264/1.5 |
| 4,831,082 | 5/1989 | Peascoe ............................. | 525/148 |
| 4,851,323 | 7/1989 | Maeda .............................. | 430/275 |
| 4,859,738 | 8/1989 | Farah et al. ....................... | 525/67 |
| 4,889,756 | 12/1989 | Barzynski et al. ................. | 428/64 |
| 4,894,401 | 1/1990 | Nelson .............................. | 524/109 |
| 4,902,557 | 2/1990 | Rohrbacher ....................... | 428/215 |
| 4,902,737 | 2/1990 | McHale et al. .................... | 524/408 |
| 4,917,960 | 4/1990 | Hornberger et al. .............. | 428/550 |
| 4,931,503 | 6/1990 | Boutni et al. ..................... | 525/67 |
| 4,937,130 | 6/1990 | Clagett et al. .................... | 428/35.7 |
| 4,940,848 | 7/1990 | Shimp .............................. | 156/307.4 |
| 4,941,730 | 7/1990 | Takase et al. ..................... | 385/143 |
| 4,971,843 | 11/1990 | Michelotti et al. ................ | 428/34 |
| 5,103,337 | 4/1992 | Schrenk et al. ................... | 359/588 |
| 5,122,905 | 6/1992 | Wheatley et al. ................. | 359/500 |
| 5,122,906 | 6/1992 | Wheatley .......................... | 359/500 |
| 5,126,880 | 6/1992 | Wheatley et al. ................. | 359/587 |

FOREIGN PATENT DOCUMENTS

| | | |
|---|---|---|
| 0404463 | 12/1990 | European Pat. Off. . |
| 0469732 | 5/1992 | European Pat. Off. . |
| 2-186302 | 7/1990 | Japan . |
| 3-139603 | 6/1991 | Japan . |
| 2015812 | 9/1979 | United Kingdom . |
| 2066155 | 7/1981 | United Kingdom . |

Primary Examiner—Scott J. Sugarman
Assistant Examiner—Thong Nguyen

[57] ABSTRACT

A multilayered reflective body which is thermoformable and capable of being fabricated into films, sheets and a variety of parts while maintaining a uniform reflective appearance is provided. The reflective polymeric body includes at least first and second diverse polymeric materials of a sufficient number of alternating layers of the first and second polymeric materials such that at least 30% of the light incident on the body is reflected. A substantial majority of the individual layers of the body have an optical thickness of not more than 0.09 micrometers or not less than 0.45 micrometers, and adjacent layers of the first and second polymeric materials differ from each other in refractive index by at least about 0.1. The reflective body may be fabricated into sheets, mirrors, noncorroding metallic appearing articles and parts, reflectors, reflective lenses, and the like.

71 Claims, 6 Drawing Sheets

1

OPTICALLY DISSIMILAR COMPOSITION FOR POLYMERIC REFLECTIVE BODIES

CROSS-REFERENCE TO RELATED APPLICATION

This application is a continuation-in-part of U.S. application Ser. No. 07/466,168, filed Jan. 17, 1990, entitled Thick/Very Thin Multilayer Reflective Polymeric Body, now U.S. Pat. No. 5,122,906, and U.S. application Ser. No. 07/463,645, filed Jan. 11, 1990, entitled Reflective Polymeric Body, now U.S. Pat. No. 5,122,905, the disclosures of which are hereby incorporated by reference.

BACKGROUND OF THE INVENTION

The present invention relates to a multilayered polymeric body which reflects light and which can be fabricated to have a silvery or hued (i.e., copper, gold, etc.) metallic or nonconventional hued (i.e., blue, green, etc.) appearance, and to articles produced therefrom which may find use as mirrors, reflectors, lenses, polarizers, and the like.

Highly reflective articles (i.e., articles having a reflectance of 70-85% or greater) are generally sought by industry for a number of uses. Conventional methods for fabricating reflective surfaces include forming such surfaces of highly polished metals. Because of the high costs and fabricating problems involved in using metals, more recently fabricators have used plastic surfaces which contain thin coatings of metal thereon. Thus, metal coated plastic articles are now commonly found as both decorative and functional items in a number of industries. Such articles are used as bright work for consumer appliances such as refrigerators, dishwashers, washers, dryers, radios, and the like. These types of articles are also used by the automotive industry as head lamp reflectors, bezels, radio knobs, automotive trim, and the like.

Typically, such metal coated plastic articles are formed by electroplating or by the vacuum, vapor, or chemical deposition of a thin metal layer on the surface of the article. Such coatings are subject to the chipping and flaking of the metal coatings as well as corrosion of the metal over time. If additional protective layers must be applied over the metal coating to protect it, additional labor and materials costs are involved. Further, there may be environmental disposal problems with some metal deposition processes.

Multilayer articles of polymers are known, as are methods and apparatuses for making such articles. For example, such multilayered articles may be prepared utilizing multilayer coextrusion devices as described in commonly-assigned U.S. Pat. Nos. 3,773,882 and 3,884,606 to Schrenk. Such devices are capable of simultaneously extruding diverse thermoplastic polymeric materials in substantially uniform layer thicknesses. The number of layers may be multiplied by the use of a device as described in commonly-assigned U.S. Pat. No. 3,759,647 to Schrenk et al.

Im et al, U.S. Pat. No. 4,540,623, teach a multilayer laminated article which includes a polycarbonate as one of the alternating layers. The articles of Im et al, however, are intended to be transparent rather than reflective and to exhibit optical properties comparable to a pure polycarbonate polymer.

Alfrey, Jr. et al, U.S. Pat. No 3,711,176, teach a multilayered highly reflective thermoplastic body fabricated using thin film techniques. That is, the reflective thin film layers of Alfrey, Jr. et al relied on the constructive interference of light to produce reflected visible, ultraviolet, or infrared portions of the electromagnetic spectrum. Such reflective thin films have found use in decorative items because of the iridescent reflective qualities of the film.

However, the films of Alfrey, Jr. et al are extremely sensitive to thickness changes, and it is characteristic of such films to exhibit streaks and spots of nonuniform color. Further, color reflected by such films is dependent on the angle of incidence of light impinging on the film. Thus, such films are not practical for uses which require uniformity of reflectivity. Moreover, such films are not practical to thermoform into articles as localized thinning of the layers during thermoforming causes alterations in the reflective characteristics of the films.

In addition to the problems discussed above, many reflective articles such as those used in the automotive industry are exposed to extreme environmental conditions and do not exhibit good weatherability or resistance to solvents. Further, many of the films used in the production of reflective articles exhibit poor ductility and are thus difficult to thermoform into articles.

Accordingly, there remains a need in the art for a polymeric reflective sheet or body which can be fabricated into relatively thick parts without alteration of the uniform reflective appearance of the material over a range of processing conditions and part geometry. Further, there is a need for a highly reflective polymeric sheet or body which can be post formed without alteration of the uniform reflective appearance of the material. Still further, there is a need for silvery or metallic appearing articles which do not use metal and which exhibit good ductility, good weatherability, and resistance to solvents.

SUMMARY OF THE INVENTION

The present invention meets those needs by providing a multilayered polymeric reflective body which is post formable and capable of being fabricated into a variety of shapes while maintaining a uniform highly reflective appearance. The terms "reflective", "reflectivity", "reflection", and "reflectance" as used herein refer to total reflectance (i.e., ratio of reflected wave energy to incident wave energy) sufficiently specular in nature such that the polymeric body has a metallic appearance. The use of these terms is intended to encompass semi-specular or diffuse reflection such as that of brushed metal, pewter, and the like. In general, reflectance measurement refers to reflectance of light rays into an emergent cone with a vertex angle of 15 degrees centered around the specular angle.

A specific intensity of reflectance, when used herein, is the intensity of reflection which occurs at a wavelength where negligible absorption occurs. For example, a silver appearing article reflects substantially all visible wavelengths, whereas the introduction of a dye to achieve other metallic hues will necessarily lower reflectivity of the body at the absorbing wavelengths. Wavelengths unaffected by the dye will be reflected at essentially the same intensity as a non-dyed sample, and it is at these unaffected wavelengths to which the intensity of reflection is referring.

According to one aspect of the present invention, a reflective polymeric body of at least first and second diverse polymeric materials is provided, the body comprising a sufficient number of alternating layers of the first and second polymeric materials such that at least 30% of light incident on the body is reflected. As used herein, the term "light" is meant to encompass not only visible light but also electromagnetic radiation in both the infrared and ultraviolet regions of the spectrum. The term "at least 30% of light incident on the body" refers, as discussed above, to reflected light at wavelengths where negligible absorption occurs.

A substantial majority of the individual layers of the body have an optical thickness of not more than 0.09 micrometers or not less than 0.45 micrometers with at least one of the individual layers having an optical thickness of not less than 0.45 micrometers. The individual layers should have an optical thickness such that no visibly perceived iridescence is reflected from the body. In general, where at least 75% of the individual layers have at least an optical thickness of 0.45 micrometers or greater or 0.09 micrometers or less, there is no visibly perceived iridescence. The first and second polymeric materials should differ from each other in refractive index by at least about 0.1.

In a preferred embodiment of the invention, highly reflective bodies reflecting from 70-85% and greater of light incident on such bodies are provided by selecting polymers having large refractive index mismatches. We have previously described reflective polymeric bodies in which the refractive index mismatch between the first and second polymeric materials is approximately 0.1. See, U.S Pat. Nos. 5,122,905 and 5,122,906. To produce highly reflective bodies (i.e., 70-85% or greater reflectance) using these materials requires a large number of alternating layers (i.e., 2000 or more). The need for a large number of layers in the body may present processing difficulties in generating that number of layers and maintaining the integrity of each layer without layer distortion, fragmentation, or intermixing. Additionally, the larger the number of layers which are required, the greater the minimum thickness for the body which is produced.

By increasing the mismatch in refractive index between polymers in the layers, highly reflective bodies may be produced which require fewer layers. Preferably, the selection of polymers having refractive index mismatches of greater than about 0.1 produces highly reflective bodies with a fewer number of layers and suitable total thicknesses.

Certain substantially transparent polymers having either a relatively high refractive index or a relatively low refractive index are suitable for use in the present invention. In one embodiment of the invention, one of the polymeric materials is a copolycarbonate of bisphenol-A and 4,4'-thiodiphenol. The copolymer may comprises from 5-80 mole percent 4,4'-thiodiphenol and from 20-95 mole percent bisphenol-A. Preferably, the 4,4'-thiodiphenol is present in a mole ratio of approximately 3 to 1 relative to the bisphenol-A. Such a copolymer has a refractive index of greater than 1.6.

The polymeric body comprises alternating layers of diverse polymeric materials. In one embodiment of the invention using a layer pattern of repeating units ABAB, the first (B) polymeric material comprises a copolycarbonate of bisphenol-A and 4,4'-thiodiphenol and the second (A) material comprises polymethyl methacrylate. The resulting reflective polymeric body has increased reflectivity for a lesser number of layers due to the greater refractive index mismatch of the copolymer and the polymethyl methacrylate.

In another embodiment of the invention, one of the first polymeric materials is comprised of a miscible blend or copolymer of polymethyl methacrylate and polyvinylidene fluoride. The blend may comprise from 95-5 weight percent polymethyl methacrylate and from 5-95 weight percent polyvinylidene fluoride, while the copolymer may comprise from 95-5 mole percent methyl methacrylate and from 5-95 mole percent vinylidene fluoride. Preferably, the polymethyl methacrylate is present in the blend in roughly equal proportions with polyvinylidene fluoride. Such a blend has a refractive index of only about 1.45. In combination with a bisphenol-A polycarbonate or a copolycarbonate derived from thiodiphenol and bisphenol monomers using a layer pattern of repeating units ABAB, the resulting multilayer bodies exhibit increased reflectivity for a lesser number of layers due to the refractive index mismatch of the copolycarbonate (refractive index approximately 1.64) and the polymethyl methacrylate/polyvinylidene fluoride blend (refractive index approximately 1.45).

In another embodiment of the invention, one of the polymeric materials comprises a miscible blend of polymethyl methacrylate and a fluoropolymer where the fluoropolymer is a copolymer of vinylidene fluoride and a fluorocarbon monomer selected from the group consisting of chlorofluoroethylene, chlorodifluoroethylene, chlorotrifluoroethylene, hexafluoroacetone, hexafluoropropylene, hexafluoropropene, pentafluoropropylene, trifluoroethylene, tetrafluoroethylene, and vinyl fluoride. Preferably, the blend comprises from 95-5 weight percent polymethyl methacrylate and from 5-95 weight percent fluoropolymer. Preferred second polymeric materials in the multilayer body include a copolycarbonate of thiodiphenol and bisphenol-A or a bisphenol-A polycarbonate.

In yet another embodiment of the invention, one of the polymeric materials comprises a copolymer of methyl methacrylate, vinylidene fluoride and a fluorocarbon monomer selected from the group consisting of chlorofluoroethylene, chlorodifluoroethylene, chlorotrifluoroethylene, hexafluoroacetone, hexafluoropropylene, hexafluoropropene, pentafluoropropylene, trifluoroethylene, tetrafluoroethylene, and vinyl fluoride. Preferably, the copolymer comprises from 90-10 mole percent methyl methacrylate, from 5-45 mole percent vinylidene fluoride, and from 5-45 mole percent fluorocarbon monomer. A preferred second polymeric material in the multilayer body is a copolycarbonate of thiodiphenol and bisphenol-A.

In another embodiment of the invention, the polymeric materials differ from each other in refractive index by at least about 0.03. In this embodiment, the polymeric reflective bodies are prepared from polymethyl methacrylate/polyvinylidene fluoride miscible blends or copolymers. Use of these materials results in a polymeric body which is more resistant to solvents, more ductile and more weatherable. In one embodiment, the first material comprises polyvinylidene fluoride and the second polymeric material comprises copolymers or a miscible blend of from 100-45 percent polymethyl methacrylate and from 0-55 percent polyvinylidene fluoride (blend percentages by weight; copolymer percentages by moles). In another embodiment, the first polymeric material comprises polymethyl methacrylate and the second material comprises a miscible blend of from 0-60 weight percent polymethyl methacrylate and from 100-40 weight percent polyvinylidene fluoride.

In still another embodiment, the first polymeric material comprises polymethyl methacrylate and the second polymeric material comprises a copolymer of from 0-80 mole percent methyl methacrylate, from 60-10 mole percent vinylidene fluoride, and from 40-10 mole percent of a fluorocarbon monomer selected from the group consisting of chlorofluoroethylene, chlorodifluoroethylene, chlorotrifluoroethylene, chlorotrifluoroethylene, hexafluoroacetone, hexafluoropropylene, hexafluoropropene, pentafluoropropylene, trifluoroethylene, tetrafluoroethylene, and vinyl fluoride.

An outer layer may be included as a protective surface or skin layer for the multilayer body and may form both major exterior surfaces for an ABAB repeating unit body. The skin layer may be sacrificial, or may be permanent and serve as a scratch resistant or weatherable protective layer. Further, such skin layers may be post applied to the body after coextrusion. For example, a skin layer may be applied as a sprayed on coating which acts to level the surface of the body to improve optical properties and impart scratch resistance, chemical resistance and/or weatherability. The skin layer may also be laminated to the multilayered body. Lamination is desirable for those polymers which are not readily coextrudable.

In a preferred form, the polymeric body is coextruded and every other layer in the ABAB repeating unit is a thick optical layer of 0.45 micrometers or greater while the other layer is a very thin optical layer of 0.09 micrometers or less. In certain embodiments of the invention, to obtain high reflectivity it is desirable to form the reflective polymeric body to comprise at least 500 or more layers. Increasing the number of layers in the polymeric body has been found to increase its reflectivity (i.e., the percentage of incident light reflected from the body). Thus, by controlling the number of layers, the degree of reflectivity of the article may be controlled.

In some embodiments of the invention it may be desirable to incorporate coloring agents such as dyes or pigments into one or more of the individual layers of the polymeric body. This can be done to one or both of the outer or skin layers of the body, or alternatively, the coloring agent may be incorporated into one or more interior layers in the body. The coloring agents may be selected to give the polymeric body a metallic appearance other than its normal silvery appearance such as bronze, copper, or gold, for example.

Different colors such as black, blue, red, yellow, white, and the like may also be incorporated in the body. Typically, pigmented coloring agents or dyes are used on exterior surface layers. Coloring agents may be used in combination to provide desirable coloring and optical properties. For example, a pigmented white coloring agent may be used in an interior surface while a colored dye, such as blue, yellow, red, or green may be included on one or more surface layers to provide a unique reflective colored effect.

Further, while the normal surface of the body is smooth to give a highly reflective silver appearance, in some instances it may be desirable to give the surface of the body a roughened or brushed appearance to simulate a brushed metallic appearance. Further, a solvent may be used to etch the surface of the multilayer body to provide a matte or pewter look to the body. Additionally, the body may be embossed with a variety of patterns to provide desirable optical effects. The polymer systems may be chosen to be semicrystalline to provide a more diffused reflection for aesthetic or functional control of light.

The reflective polymeric body of the present invention may find several applications. In another embodiment of the invention, the reflective body may be fabricated as a mirror-like polymeric article having at least first and second major surfaces, the article comprising a sufficient number of alternating layers of first and second polymeric materials such that at least 30% of the light incident on the article is reflected. A substantial majority of the individual layers of the article have an optical thickness of not more than 0.09 micrometers or not less than 0.45 micrometers, with at least one of the individual layers having an optical thickness of at least 0.45 micrometers, and wherein the first and second polymeric materials differ from each other in refractive index by at least about 0.1. In this embodiment of the invention, the first polymeric material comprises a copolycarbonate of bisphenol-A and 4,4'-thiodiphenol and the second polymeric material comprises polymethyl methacrylate. In another variant of this embodiment, the first material comprises bisphenol-A polycarbonate or a copolycarbonate derived from thiodiphenol and bisphenol monomers and the second polymeric material comprises of a miscible blend or copolymer of polymethyl methacrylate and polyvinylidene fluoride.

To provide the mirror-like quality to the article, one of the major surfaces preferably includes a light absorbent layer, such as a layer of a black or other colored pigment. The light absorbent layer may be coextruded or applied as a lacquer, paint, or lamination. Alternatively, increasing the number of individual layers or increasing the refractive index mismatch between polymers results in increased reflectance of incident light from the article resulting in a mirror-like quality in the article.

The reflective polymeric body of the present invention may also be fabricated to appear mirror-like on all major surfaces by coextruding a light absorbing layer in the interior of the article. Thus, a mirror-like polymeric article is provided which has at least first and second major surfaces, with the article comprising an interior light absorbing layer and a sufficient number of alternating layers of first and second polymeric materials such that at least 30% of light incident on the article is reflected on at least one side of the interior light absorbing layer. A substantial majority of the individual layers of the article have an optical thickness of not more than 0.09 micrometers or not less than 0.45 micrometers, while the first and second polymeric materials differ from each other in refractive index by at least about 0.1. In this embodiment of the invention, the first polymeric material comprises a copolycarbonate of bisphenol-A and 4,4'-thiodiphenol and the second polymeric material comprises polymethyl methacrylate. In another variant of this embodiment, the first material comprises bisphenol-A polycarbonate or a copolycarbonate derived from thiodiphenol and bisphenol-A monomers and the second polymeric material comprises a miscible blend or copolymer of polymethyl methacrylate and polyvinylidene fluoride.

The reflective polymeric body of the present invention may also be fabricated to act as a birefringent light polarizer which polarizes a broad band of the electromagnetic spectrum. The polarizer is fabricated of at least first and second diverse polymeric materials, with the polarizer comprising a sufficient number of alternating layers of the first and second polymeric materials such that at least 30% of light incident in the plane of polarization on the polarizer is reflected in the plane of polarization. A substantial majority of the individual layers of the polarizer have an optical thickness of not more than 0.09 micrometers or not less than 0.45 micrometers, while the first and second polymeric materials differ from each other in refractive index by no more than about 0.03 in one plane of the polarizer. In a preferred embodiment, the difference in refractive index between the first and second polymeric materials is caused by selecting polymers having differing stress optical coefficients and then stretching those materials in a uniaxial direction to orient the polymeric materials. In this embodiment of the invention, the first polymeric material comprises a copolycarbonate of bisphenol-A and 4,4'-thiodiphenol having a positive stress optical coefficient and the second material comprises a suitably chosen polymer having a negative stress optical coefficient such as polystyrene. In another variant of this embodiment, the first material comprises a suitably chosen polymer having a negative stress optical coefficient and the second polymeric material comprises of a miscible blend of polymethyl methacrylate and polyvinylidene fluoride. The stress optical coefficient of blends of polymethyl methacrylate and polyvinylidene fluoride may be compositionally adjusted as polymethyl methacrylate has a slightly negative stress optical coefficient while polyvinylidene fluoride has a strongly positive stress optical coefficient. Other suitable polymers may be found in commonly-assigned, copending application Ser. No. 07/618,191, filed Nov. 26, 1990, the disclosure of which is hereby incorporated by reference.

Additionally, the multilayer reflective polymeric bodies of the present invention may be formed into a number of decorative and/or structural parts. The bodies may be formed by coextrusion techniques initially into sheets which may then be post formed. Such post forming operations may include thermoforming, vacuum forming, or pressure forming. Further, through the use of forming dies, the multilayer reflective body may be initially formed into a variety of useful shapes including profiles, tubes, parisons which can then be formed into blow-molded containers, and the like.

The reflective polymeric bodies of the present invention are also useful in applications such as optical interference films which reflect wavelengths of light in the infrared region of the spectrum while being transparent to wavelengths of light in the visible spectrum. Such optical interference films may be comprised of multiple alternating layers of first, second and third diverse polymeric materials having an optical thickness of between 0.09 and 0.45 micrometers. See, U.S. application Ser. No. 07/557,262, filed Jul. 24, 1990, now U.S. Pat. No. 5,103,337. See also commonly assigned U.S. application Ser. No. 456,922, filed Dec. 26, 1989, now U.S. Pat. No. 5,149,578 directed to tamper evident films. The reflective polymeric bodies of the present invention are also useful in that application.

Accordingly, it is an object of the present invention to provide a highly reflective polymeric body which can be fabricated into a variety of parts, is post formable, and which has a uniform, highly reflective appearance. This, and other objects and advantages of the invention will become apparent from the following detailed description, the accompanying drawings, and the appended claims.

DETAILED DESCRIPTION OF THE PREFERRED EMBODIMENTS

Figure 1:
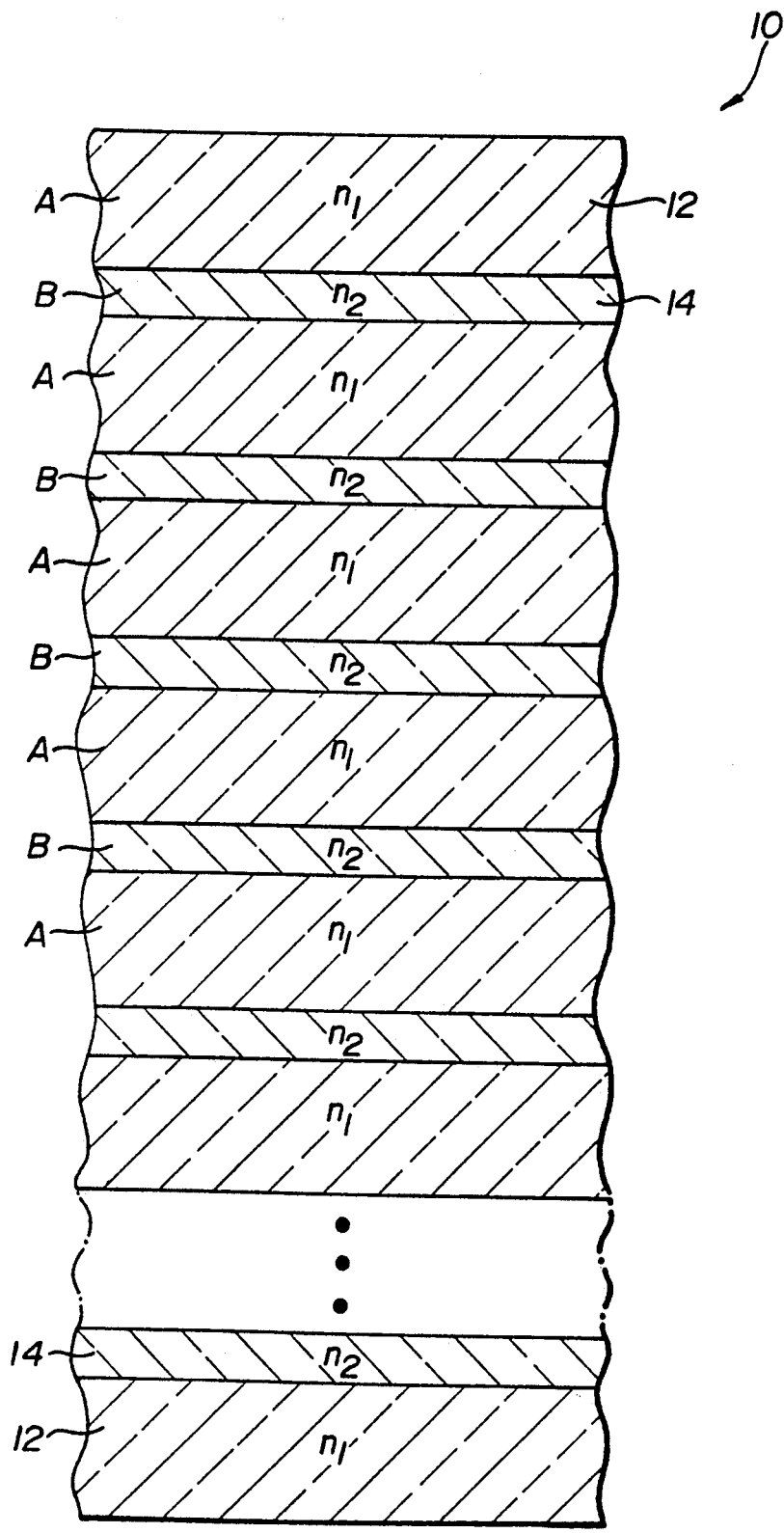
FIG. 1 is a schematic cross-section of a two component multilayer polymeric reflective body of the present invention, where the first polymer, A, has a refractive index, $n_1$, and the second polymer, B, has a refractive index, $n_2$.

The present invention provides a highly reflective multilayer polymeric body made up of from a hundred to several thousand alternating layers of polymers which differ from each other in refractive index. A substantial majority of the individual layers of the polymeric materials have an optical thickness of not more than 0.09 micrometers or not less than 0.45 micrometers, where the optical thickness is defined as the product of the individual layer thickness times the refractive index of the polymeric material which makes up that layer. Preferably, the individual layers which make up the multilayer body are substantially continuous.

Thus, the multilayer reflective polymeric body of the present invention is made up of multiple alternating optically thick or very thin layers, as opposed to the multilayer "thin film" articles of the prior art. For purposes of optical properties, i.e., reflectance and transmittance, a thin film can be described as a film thinner than one wavelength of light at which the film will be applied. Thus, for films to be used in the visible wavelength band, a thin film is described in the literature as one whose thickness, D, is less than about 0.5 micrometer or whose optical thickness, ND (where N is the refractive index of the material) is less than about 0.7 micrometers. Vasicek, *Optics of Thin Films* (1960) at pages 100 and 139.

Prior art thin film layer articles describe interference films which rely on the constructive optical interference of light to produce intense reflected light in the visible, ultraviolet, or infrared portions of the electromagnetic spectrum for normal incidence according to the equation:

$$\lambda_m = (2/m)(N_1 D_1 + N_2 D_2),$$

where $\lambda_m$ is the reflected wavelength in nanometers, $N_1$ and $N_2$ are the refractive indices of the alternating polymers, $D_1$ and $D_2$ are the thickness of the respective layers of polymers in nanometers, and m is the order of reflection (m=1,2,3,4,5). Each solution of the equation determines a wavelength at which an intense reflection, relative to surrounding regions, is likely to occur. The intensity of the reflection is a function of the "f-ratio" where, for a two component system, $$f = N_1 D_1 / (N_1 D_1 + N_2 D_2)$$

By proper selection of the f-ratio, one can exercise some degree of control over the intensity of reflection of the various higher order reflections. For example, first order visible reflections of violet (0.38 micrometer wavelength) to red (0.68 micrometer wavelength) can be obtained with layer optical thicknesses between about 0.075-0.25 micrometers. Iridescent films may also be designed to reflect visible light at higher order reflectances, although at lower intensities.

As can be seen, such thin film polymeric bodies are strongly dependent upon film (and individual layer) thickness to determine reflected wavelength. Such thin films are extremely sensitive to thickness changes, and it is characteristic of such thin films to exhibit nonuniform streaks and spots of color.

The multilayer bodies of the present invention do not display vivid iridescence. In fact, it is an important object of this invention specifically to avoid layer thicknesses which result in substantial iridescent color. By keeping all layers sufficiently optically thick or optically very thin, higher order reflections are so closely spaced that the human eye perceives the reflection to be essentially silver and non-iridescent.

Articles made in accordance with the present invention exhibit a uniform silvery reflective appearance, not the multicolored, iridescent appearance common to prior art thin film multilayer articles. Rather, the reflective characteristics of the multilayer bodies of the present invention are governed by the following equation:

$$R = (kr)/(1 + (k-1)r) \times 100, \qquad \text{Equation 1}$$

where R is the amount of reflected light (%), k is the number of optically thick or optically very thin film layers, and $r = [(N_1 - N_2)/(N_1 + N_2)]^2$. See Vasicek, *Optics of Thin Films* (1960) at pages 69-70.

This equation indicates that the intensity of the reflected light is a function only of r and k, where r and k are defined as above. As a close approximation, R is a function only of the refractive index mismatch of the two polymer components and the total number of layer interfaces. This relationship contrasts greatly with that of prior thin film articles whose reflectivity is highly sensitive to layer thickness and angle of view.

Thus, the reflected wavelength of light from the multilayer polymeric body of the present invention is independent of both individual layer and total structure thickness over a wide processing range, so long as a substantial majority of the individual layers has an optical thickness of not less than about 0.45 micrometers, or not greater than 0.09 micrometers. Uniformity of reflection is inherent in the design of the body. Moreover, a gradient of layer thickness through the thickness of the body is neither detrimental nor advantageous to the appearance of the body as long as a substantial majority of the individual layers of the polymers maintains an optical thickness as described above. This again contrasts with prior thin film articles which reflect broad or narrow bandwidths depending upon layer thickness gradient.

Thus, it is not necessary for all of the layers in the reflective polymeric bodies of the present invention to have optical thicknesses of 0.45 micrometers or greater or 0.09 micrometers or less. The preferred coextrusion process for fabricating the polymeric bodies of the present invention may introduce layer thickness variations both through the thickness of the body and in the plane of individual layers. Variation in layer thicknesses of each polymeric component can be as much as 300% or more. However, useful reflective bodies and articles may be made even with such wide variations as long as a substantial majority of the layers have an optical thickness of not more than 0.09 micrometers or not less than 0.45 micrometers. With this condition met, there is an absence of visibly perceived interference colors reflected from bodies and articles of the present invention.

The absence of the interference colors which characterize prior art thin films is somewhat subjective to the human eye. However, we have found that about 75% of the layers in the body must have optical thicknesses greater than 0.45 micrometers or less than 0.09 micrometers to obtain the broad band, visually uniform reflectance of substantially all wavelengths (white light) which characterizes the present invention. A minority of about 25% or fewer of the layers having optical thicknesses of greater than 0.09 and less than 0.45 micrometers have been found to have interference reflections of a sufficiently low intensity so that the body will have essentially no visibly perceived iridescence.

Figure 2:
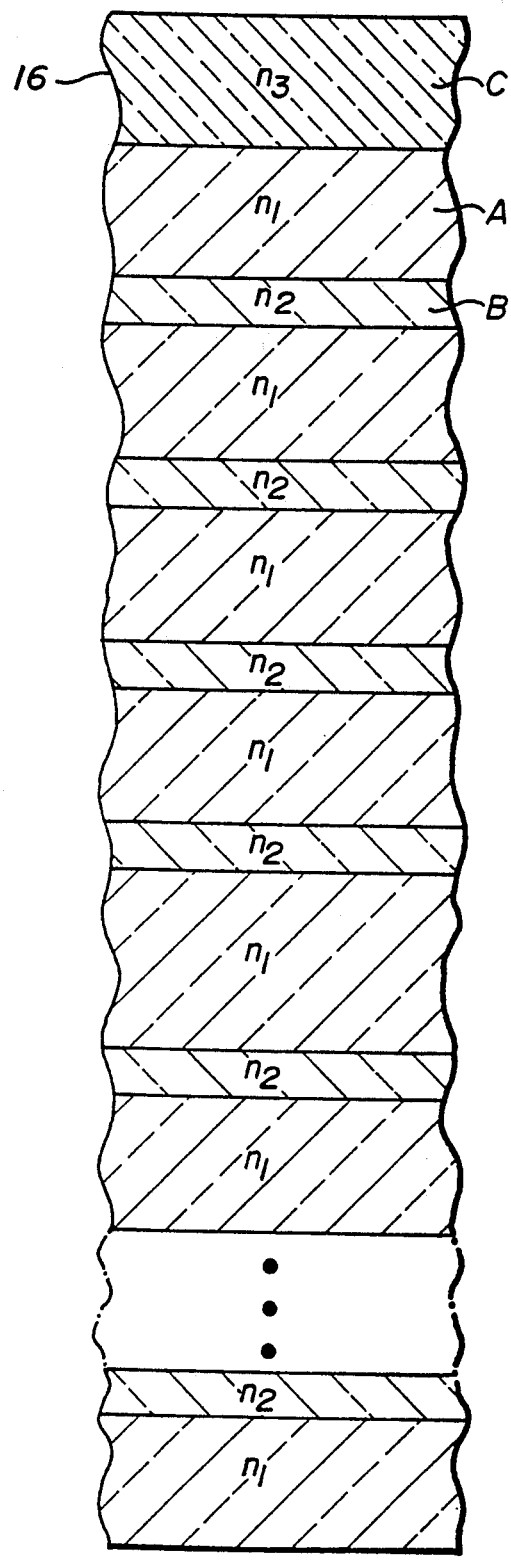
FIG. 2 is also a schematic cross-section of a two component multilayer polymeric reflective body and includes a barrier layer polymer, C, having a refractive index, $n_3$, on one exterior surface thereof.

A typical two component multilayer reflective polymer body in the form of a sheet 10 is shown schematically in FIG. 1. The body 10 includes alternating layers of first polymer (A) 12 having a refractive index, $n_1$, and a second polymer (B) 14 having a refractive index, $n_2$. FIG 1 shows a preferred form of the invention where all of the layers of first polymer A have an optical thickness of not less than 0.45 micrometers and all of the layers of second polymer B have an optical thickness of not more than 0.09 micrometers. FIG. 2 shows the presence of a third polymer (C) 16 having a refractive index, $n_3$. In this instance, the polymer acts as a barrier layer. In FIG. 2, the barrier layer is on an exterior surface of the reflective body.

Figure 3:
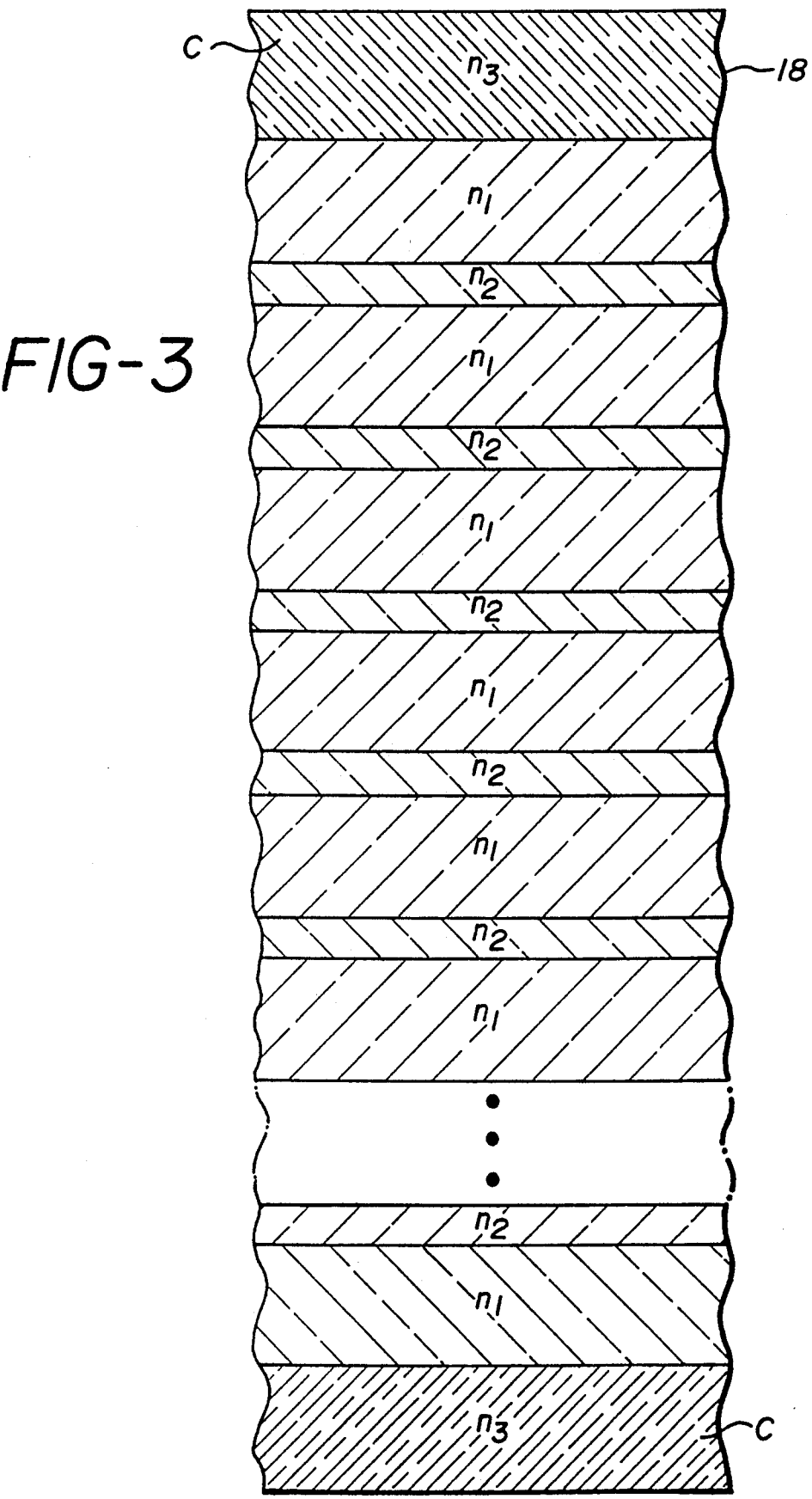
FIG. 3 is a schematic cross-section of a two component multilayer polymeric reflective body having protective skin layers of a polymer, C, having a refractive index, $n_3$, on both exterior surfaces thereof.

FIG. 3 illustrates yet another embodiment of the invention in which one or more protective skin layers are present on the reflective body. As shown in FIG. 3, skin layers of a polymer (C) 18 are positioned on both major exterior surfaces of the reflective body to protect the other layers from scratches or weathering.

The reflective polymeric bodies of the present invention become more highly reflective of incident light (i.e., transmit less light) as the number of layers is increased. Preferably, the number of layers is sufficient to produce an article which will reflect at least 30% of the incident light, for those wavelengths for which there is negligible absorption. Reflectances below about 30% are not sufficient to be readily observed. If it is desired to use the reflective polymeric body of the present invention as a mirror, adding additional layers will increase the reflectance of the body to 50% or higher to produce a silvery, mirror-like appearance.

The reflectivity of the bodies is also dependent upon the difference in refractive index between the two polymers used. That is, the greater the difference in refractive index, the greater the reflectivity of the body. In a preferred embodiment of the invention, highly reflective bodies reflecting from 70–85% and greater of light incident on such bodies are provided by the selection of polymers having refractive indices which differ from one another by at least 0.1.

Accordingly, it can be seen that the reflective nature of the polymeric bodies may be controlled by the selection of polymers having differing refractive indices and/or by fabricating the body to have additional layers.

The highly reflective multilayered polymeric bodies of the present invention preferably comprise alternating layers of a generally transparent thermoplastic materials having refractive indices differing by at least 0.1. Suitable thermoplastic resins, along with representative refractive indices, which may be used in the practice of the present invention include, but are not limited to: copolycarbonates of bisphenol-A and 4,4-thiodiphenol (refractive index = 1.59 to 1.64), blends of polymethyl methacrylate and polyvinylidene fluoride (1.38 to 1.49), bisphenol A polycarbonate (1.59), copolymers of methyl methacrylate and vinylidene fluoride (1.42 to 1.38), polymethyl acrylate (1.48), polymethyl methacrylate (1.49), blends and copolymers of polymethyl methacrylate and polyvinylidene fluoride; copolymers of vinylidene fluoride and other halogenated monomers such as chlorofluoroethylene, chlorodifluoroethylene, chlorotrifluoroethylene, chlorotrifluoroethylene, hexafluoroacetone, hexafluoropropylene, hexafluoropropene, pentafluoropropylene, trifluoroethylene, tetrafluoroethylene, and vinyl fluoride blended with polymethyl methacrylate; blends of polyvinylidene fluoride and poly(vinyl acetate); copolymers of methyl methacrylate, vinylidene fluoride, and a monomer selected from the group consisting of chlorofluoroethylene, chlorodifluoroethylene, chlorotrifluoroethylene, chlorotrifluoroethylene, hexafluoroacetone, hexafluoropropylene, hexafluoropropene, pentafluoropropylene, trifluoroethylene, tetrafluoroethylene, and vinyl fluoride blended with polymethyl methacrylate; blends of polyvinylidene fluoride and poly(vinyl acetate); perfluoroalkoxy resins (1.35); polytetrafluoroethylene (1.35); fluorinated ethylene-propylene copolymers (1.34); silicone resins (1.41); polyvinylidene fluoride (1.42); polychlorotrifluoroethylene (1.42); epoxy resins (1.45); poly(butyl acrylate) (1.46); poly(4-methylpentene-1) (1.46), poly(vinyl acetate) (1.47), ethyl cellulose (1.47), polyformaldehyde (1.48), polyisobutyl methacrylate (1.48), polymethyl acrylate (1.48), polypropyl methacrylate (1.48), polyethyl methacrylate (1.48), polyether block amide (1.49); cellulose acetate (1.49); cellulose propionate (1.49); cellulose acetate butyrate (1.49), cellulose nitrate (1.49), polyvinyl butyral (1.49), propylene (1.49); polybutylene (1.50); ionomeric resins such as Surlyn (trademark) (1.51), low density polyethylene (1.51), polyacrylonitrile (1.51), polyisobutylene (1.51), thermoplastic polyesters such as Ecdel (trademark) (1.52); natural rubber (1.52); perbunan (1.52); polybutadiene (1.52); nylon (1.53); polyacrylic imides (1.53); poly(vinyl chloro acetate) (1.54); polyvinyl chloride (1.54); high density polyethylene (1.54); copolymers of methyl methacrylate and styrene such as Zerlon (trademark) (1.54); transparent acrylonitrile-butadienestyrene terpolymer (1.54); allyl diglycol resin (1.55), blends of polyvinylidene chloride and polyvinyl chloride such as Saran resins (trademark) (1.55); polyalphamethyl styrene (1.56); styrene-butadiene latexes such as Dow 512-K (trademark) (1.56), polyurethane (1.56); neoprene (1.56); copolymers of styrene and acrylonitrile such as Tyril resin (trademark) (1.57); copolymers of styrene and butadiene (1.57); polycarbonate (1.59); other thermoplastic polyesters such as polyethylene terephthalate and polyethylene terephthalate glycol (1.60); polystyrene (1.60); polyimide (1.61); polyvinylidene chloride (1.61); polydichlorostyrene (1.62); polysulfone (1.63); polyether sulfone (1.65); and polyetherimide (1.66).

The refractive indices reported above may vary somewhat at different wavelengths. For example, the refractive index of polycarbonate is somewhat greater for light in the blue region of the spectrum and somewhat lower for light in the red region of the spectrum.

A condition for the selection of the polymers to make up the alternating layers of the body is that the polymers selected have refractive indices which differ from each other by at least about 0.1. Further, the polymers should be compatible in processing temperatures so that they may be readily coextruded. By combining thick and very thin layers, it is possible to fabricate polymeric bodies which contain up to 80% or more by volume of a first polymer (the thick layers) and 20% or less by volume of a second polymer (the very thin layers). This may result in a multilayer structure which has properties similar to the first polymer alone. Further, the resulting laminate may form a structure stronger than would be possible using a combination of alternating thick layers alone.

By selecting polymers having relatively large refractive index mismatches, highly reflective multilayer bodies may be produced since reflectance is dependent upon the number of layer interfaces and the refractive index mismatch at each layer interface. A particularly useful class of polymers for use in the present invention are miscible blends of polyvinylidene fluoride and polymethyl methacrylate. Such blends not only have a relatively low range of refractive indices, but also adhere well to polycarbonates having relatively high refractive indices. This eliminates the need for adhesive polymer layers in the body to bond other layers together in the multilayer construction. Additionally, polyvinylidene fluoride is a weatherable polymer possessing outstanding solvent resistance. Further, polyvinylidene fluoride/polymethyl methacrylate blends are significantly more ductile than polymethacrylate alone, which should aid in forming operations.

Multilayer bodies in accordance with the present invention are most advantageously prepared by employing a multilayered coextrusion device as described in U.S. Pat. Nos. 3,773,882 and 3,884,606 the disclosures of which are incorporated herein by reference. Such a device provides a method for preparing multilayered, simultaneously extruded thermoplastic materials, each of which are of a substantially uniform layer thickness. Preferably, a series of layer multiplying means as are described in U.S. Pat. No. 3,759,647 the disclosure of which is incorporated herein by reference may be employed.

The feedblock of the coextrusion device receives streams of the diverse thermoplastic polymeric materials from a source such as a heat plastifying extruder. The streams of resinous materials are passed to a mechanical manipulating section within the feedblock.

This section serves to rearrange the original streams into a multilayered stream having the number of layers desired in the final body. Optionally, this multilayered stream may be subsequently passed through a series of layer multiplying means in order to further increase the number of layers in the final body.

The multilayered stream is then passed into an extrusion die which is so constructed and arranged that streamlined flow is maintained therein. Such an extrusion device is described in U.S. Pat. No. 3,557,265, the disclosure of which is incorporated by reference herein. The resultant product is extruded to form a multilayered body in which each layer is generally parallel to the major surface of adjacent layers.

The configuration of the extrusion die can vary and can be such as to reduce the thickness and dimensions of each of the layers. The precise degree of reduction in thickness of the layers delivered from the mechanical orienting section, the configuration of the die, and the amount of mechanical working of the body after extrusion are all factors which affect the thickness of the individual layers in the final body. It is necessary, however, that the optical thickness of a substantial majority of the individual layers of polymeric material be not more than 0.09 micrometers or not less than 0.45 micrometers.

Figure 4A:
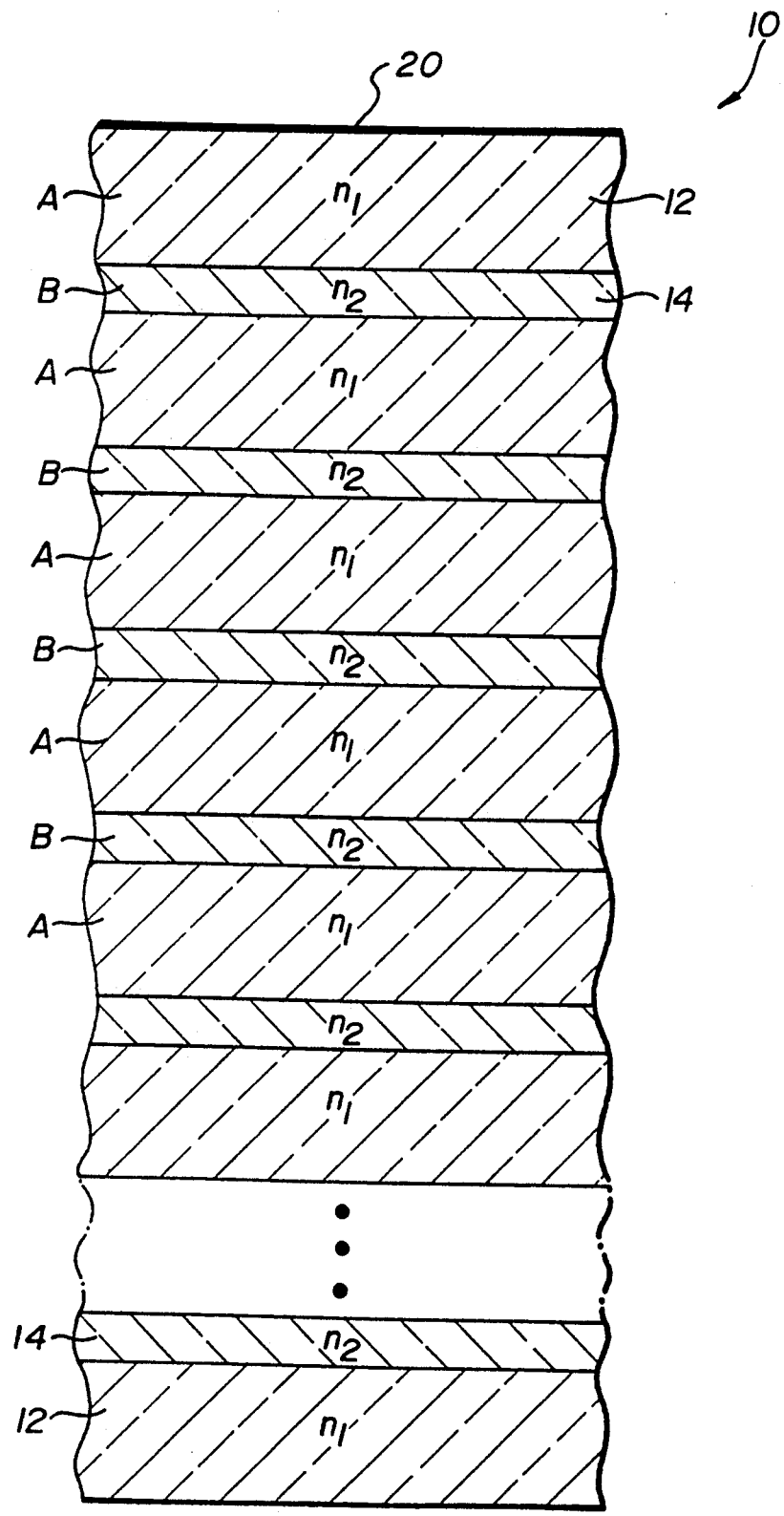
FIG. 4A is also a schematic cross-section of a two component multilayer polymeric reflective body and includes a light absorbent layer on one exterior surface thereof.
Figure 4B:
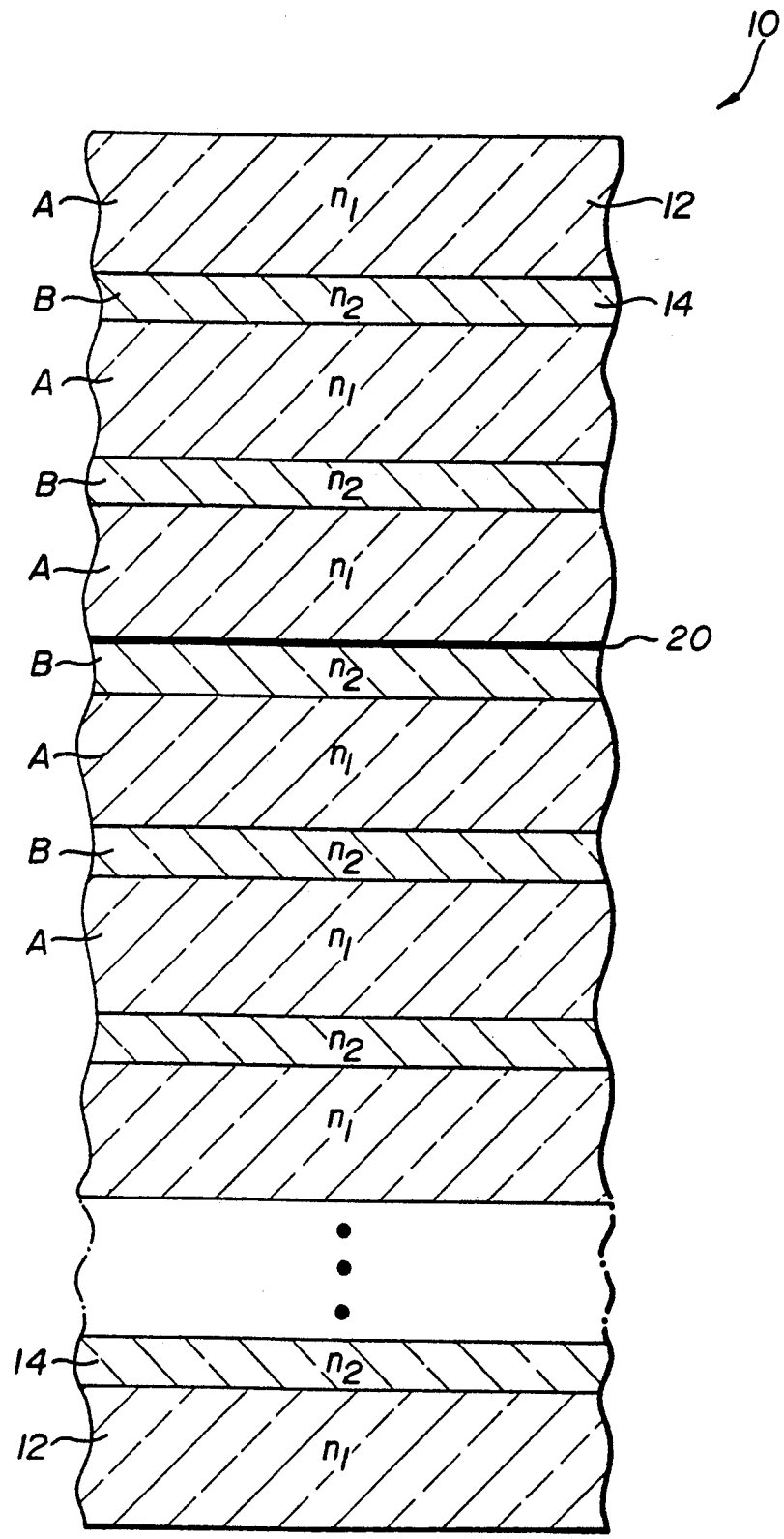
FIG. 4B is also a schematic cross-section of a two component multilayer polymeric reflective body and includes a light absorbent layer on one interior surface thereof.

Reflective polymeric bodies produced by the practice of the present invention may have a wide variety of potentially useful applications. For example, the bodies may be post formed into concave, convex, parabolic, half-silvered, etc. mirrors. If suitably flexible or rubbery polymers (elastomers) are utilized, the bodies may be bent or recoverably stretched into varying shapes. As shown in FIGS. 4A and 4B, where like reference numerals represent like elements, a mirror-like appearance may be accomplished by coextruding a black or otherwise light absorbing layer 20 on one side of the body. Alternatively, one side of the final body or into the interior of the body may be coated with a colored paint or pigment to provide a highly reflective mirror-like body. Such mirrors would not be subject to breakage as would glass mirrors.

In some embodiments of the invention it may be desirable to incorporate coloring agents such as dyes or pigments into one or more of the individual layers of the polymeric body. This can be done to one or both of the outer or skin layers of the body, or alternatively, the coloring agent may be incorporated into one or more interior layers in the body. The coloring agents may be selected to give the polymeric body a metallic appearance other than its normal silvery appearance such as bronze, copper, or gold, for example.

Different colors such as black, blue, red, yellow, white, and the like may also be used. Typically, it is most desirable to use pigmented coloring agents in the interior layers to provide opaqueness and a mirror-like reflective quality and to use dyes on exterior surface layers. Coloring agents may be used in combination to provide desirable coloring and optical properties. For example, a pigmented white coloring agent may be used in an interior surface while a colored dye, such as blue, yellow, red, or green may be included on one or more surface layers to provide a unique reflective colored effect.

Further, while the normal surface of the body is smooth to give a highly reflective silver appearance, in some instances it may be desirable to give the surface of the body a roughened or brushed appearance to simulate a brushed metallic appearance. Further, a solvent may be used to etch the surface of the multilayer body to provide a matte or pewter look to the body. Additionally, the body may be embossed with a variety of patterns to provide desirable optical effects.

The reflective polymeric bodies may also be used as birefringent polarizers. Through proper selection of the polymeric materials making up the layers, a refractive index mismatch in one plane of the polarizer may be achieved. In a preferred method, the refractive index mismatch may be created after fabrication of the reflective polymeric body. The polymeric materials may be selected so that the first material has a positive stress optical coefficient and the second polymeric material has a negative stress optical coefficient. Stretching the body containing the two polymeric materials in a uniaxial direction causes them to orient and results in a refractive index mismatch in the plane of orientation to produce the polarizer. A broad band width of visible light passing through such bodies is polarized. This is in distinction to prior thin film multilayer polarizers which polarized only specific narrow wavelength ranges of light.

Additionally, the highly reflective polymeric bodies may be fabricated as non-corroding metallic appearing articles for indoor or outdoor exposure. For example, the polymeric bodies may be fabricated into signs, or bright work for appliances. The bodies may be post formed into highly reflective parts such as automotive head lamp reflectors, bezels, hub caps, radio knobs, automotive trim, or the like, by processes such as thermoforming, vacuum forming, shaping, rolling, or pressure forming. The bodies may also be formed into silvery or metallic appearing bathroom or kitchen fixtures which do not corrode or flake.

Figure 6:
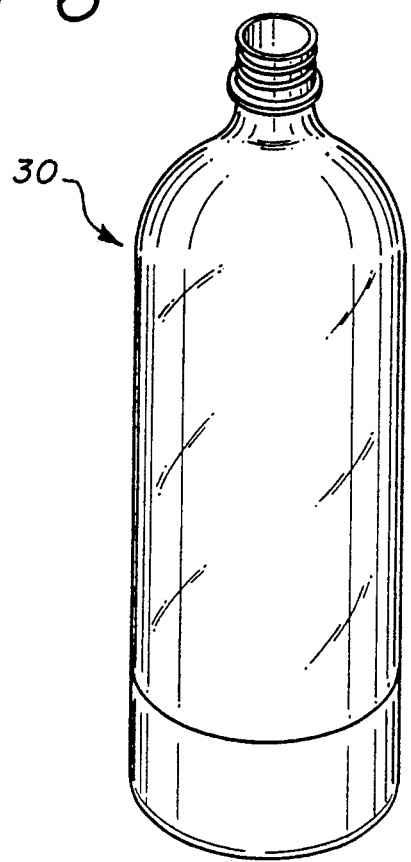
FIG. 6 is a perspective view of a blow-molded container made from the multilayer reflective body of the present invention.
Figure 5:
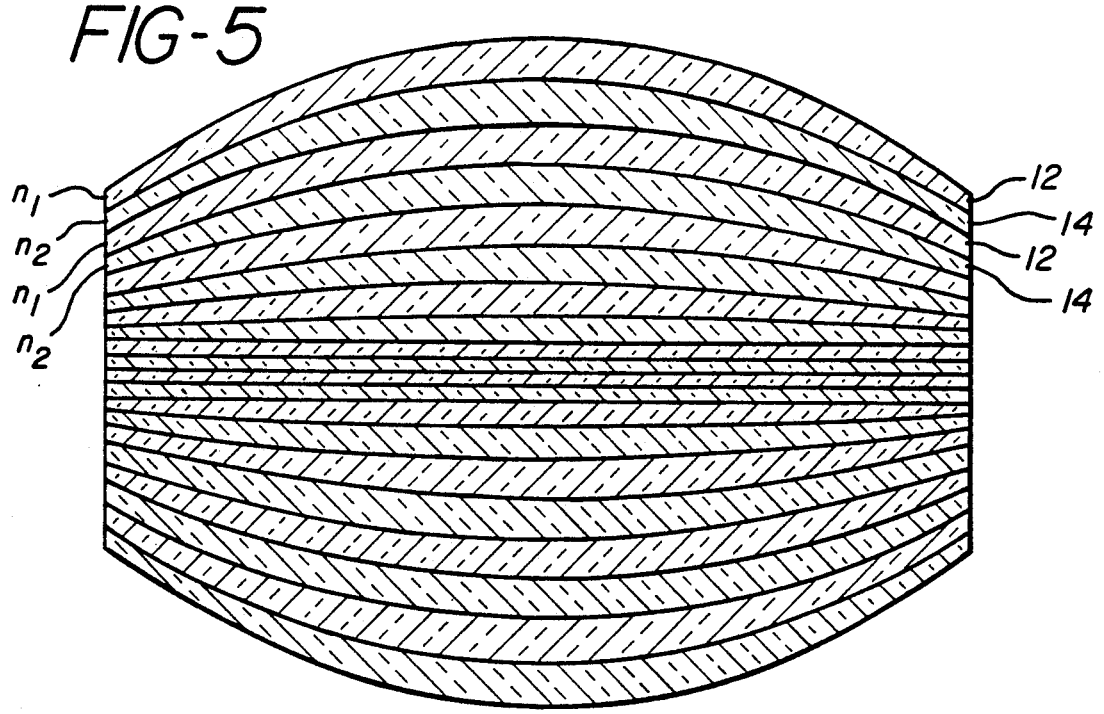
FIG. 5 is a schematic cross-section of a two component multilayer polymeric reflective body which has been formed into a lenticular profile.

A number of different profiles may be coextruded in addition to sheets and films of the reflective polymeric materials. By profiles, we mean shaping of the multilayer body either in a forming die or outside of a die by a post forming procedure. Examples of profiles which may be shaped include sheets, channels, round or elliptical tubes, parison, and lenticular (i.e., double convex lens) cross-sections. An exemplary lenticular cross-section is shown in FIG. 5 with alternating layers of first polymer 12 having a refractive index, $n_1$, and a second polymer 14 having a refractive index, $n_2$. For example, decorative moldings such as wall moldings and picture frame moldings, automotive trim, home siding, and the like may be readily coextruded through forming dies. Use of a tubular extrusion die produces a multilayered metallic appearing pipe. Such tubular dies may also be used to produce parisons which may then be blow molded into silvery appearing bottles and containers such as blow-molded container 30 illustrated in FIG. 6. Because the materials used in the construction of the body may be selected for given desired properties, the final body may be flexible or rubbery, producing an article which could be used as a variable focal length reflector by flexing the article to different degrees.

The reflective polymeric bodies of the present invention may also be post formed into a wide variety of items such as two-way mirrors, black bodies for insulation, and solar intensifiers to concentrate solar radiation. The bodies may also be formed into dinnerware, tableware, containers, and packages. By the proper selection of the polymers which were used, such articles may be made to be microwavable.

In order that the invention may be more readily understood, reference is made to the following examples, which are intended to be illustrative of the invention, but are not intended to be limiting in scope.

EXAMPLE 1

Employing an apparatus as generally described in U.S. Pat. Nos. 3,773,882 and 3,759,647, a sheet of a reflective polymeric body was prepared. The sheet was approximately 1.2 mm in thickness and had 657 alternating layers (ABABAB) of polycarbonate and a polymethyl methacrylate/polyvinylidene fluoride blend. The respective polymers used were (1) bisphenol-A polycarbonate (BAPC): Calibre 302-22 (trademark of The Dow Chemical Company); (2) polymethyl methacrylate (PMMA): Cyro Acrylite H15-003, (trademark of Cyro Industries); and (3) polyvinylidene fluoride (PVdF): Kynar 720 (trademark of Pennwalt). A substantial majority of the layers in the final sheet had optical thicknesses of at least 0.45 micrometers. The refractive index of BAPC ($n_1$) was 1.590, while the refractive index of PMMA/PVdF ($n_2$) was varied by adjusting the blend composition as shown below.

| Sample | PMMA/PVdF Ratio (weight/weight) | Refractive Index ($n_2$) (550 nm) | $\Delta n$ ($n_1-n_2$) |
|---|---|---|---|
| 1 | 100/0 | 1.495 | 0.095 |
| 2 | 80/20 | 1.479 | 0.111 |
| 3 | 60/40 | 1.459 | 0.131 |

A series of extruders, gear pumps, and static mixers fed molten polymer streams of BAPC (component A) and PMMA/PVdF blends (component B, which was derived from a salt and pepper extruder feed mixture) to a feedblock which provided a melt stream consisting of 83 alternating layers (ABAB - - - BABA structure). The layered stream was subsequently passed through three layer multipliers which effected an increase in the total number of layers to 657. An additional extruder provided an outer skin layer of BAPC. The resulting construction was spread in a coathanger style die (width=40.6 cm, die gap=3.6 mm) and subsequently passed through cooling rolls in an S-wrap configuration. The BAPC and PMMA/PVdF materials were extruded at a temperature of approximately 260° C. Components A and B were extruded at a rate of 9.5 kg/hr. while the skin layer was extruded at a rate of 5.5 kg/hr.

The reflectivity of the sheet was determined with a Beckman Model DU-7 spectrophotometer (equipped with a reflectance jig) for wavelengths ranging from 400 nm to 800 nm. The data obtained is shown below. Theoretical reflectivity was calculated using Equation 1, above.

| Sample | PMMA/PVdF Ratio (weight/weight) | Percent Reflectivity (550 nm) | Theoretical Reflectivity |
|---|---|---|---|
| 1 | 100/0 | 43 | 44 |
| 2 | 80/20 | 50 | 51 |
| 3 | 60/40 | 73 | 58 |

The results show that as the refractive index mismatch ($\Delta n$) between the A and B components is increased, the reflectivity of the body is increased, for bodies having the same number of layers.

EXAMPLE 2

Using the same apparatus and polymers as in Example 1, a reflective multilayer body having 1313 alternating layers was coextruded.

The refractive index of the BAPC ($n_1$) was 1.590, while the refractive index of the PMMA/PVdF ($n_2$) was varied by adjusting the blend composition as shown below.

| Sample | PMMA/PVdF Ratio (weight/weight) | Refractive Index ($n_2$) (550 nm) | $\Delta n$ ($n_1-n_2$) |
|---|---|---|---|
| 1 | 100/0 | 1.495 | 0.095 |
| 2 | 60/40 | 1.459 | 0.131 |

The BAPC and PMMA/PVdF materials were extruded at a temperature of between 255° C. and 265° C. The rates of extrusion were as follows:

| Sample | PC (kg/hr) | PMMA/PVdF (kg/hr) | Skin (kg/hr) |
|---|---|---|---|
| 1 | 17 | 8.5 | 8.0 |
| 2 | 20 | 6.5 | 7.5 |

A reflective sheet was produced in which a substantial majority of the layers had an optical thickness of at least 0.45 micrometers. No iridescent color was observed.

The reflectivity of the sheet was determined with a Beckman Model DU-7 spectrophotometer (operating in the transmission mode) for wavelengths ranging from 400 nm to 800 nm. The data obtained is shown below. The theoretical reflectivity was calculated using Equation 1, above.

| Sample | PMMA/PVdF Ratio (weight/weight) | Percent Reflectivity (550 nm) | Theoretical Reflectivity |
|---|---|---|---|
| 1 | 100/0 | 60 | 59 |
| 2 | 60/40 | 80 | 73 |

Again, the results show that by increasing the refractive index mismatch ($\Delta n$) between the A and B components, the reflectivity of the body is increased.

EXAMPLE 3

A sheet of reflective polymeric body was prepared by employing the same apparatus described in Example 1. The sheet was approximately 2.0 mm thick and had 1857 alternating layers of BAPC and PMMA.

A substantial majority of layers in the final sheet had optical thicknesses of greater than 0.45 mm. The refractive index of the BAPC was 1.590, while the refractive index of the PMMA was 1.495.

The sheet was prepared by feeding molten polymer streams of BAPC (component A) and PMMA (component B) to a feedblock which provided a preordained melt stream that consisted of 233 alternating layers (ABAB - - - BABA structure). A protective boundary layer of BAPC was added. The layered stream was subsequently passed through three layer multipliers which effected an increase in the total number of layers to 1857. An additional extruder provided an outer skin layer of BAPC.

The resulting construction was spread in a coathanger style die (width=40.6 cm, die gap=2.5 mm) and subsequently passed through cooling rolls in an S-wrap configuration.

Component A was extruded at a rate of 23 kg/hr at 320° C., and Component B was extruded at a rate of 23 kg/hr at 260° C. The protective boundary layer was extruded at a rate of 3 kg/hr at 260° C. and the outer skin layer was extruded at a rate of 9 kg/hr at 260° C.

Reflectivity was determined with a Beckman Model DU-7 spectrophotometer (operating in the transmission mode) for wavelengths ranging from 400 nm to 800 nm. The resulting data is shown below. The data for Sample 2 was taken from sample 3 in Example 1 and is provided for comparison purposes.

| Sample | PMMA/PVdF Ratio (weight/weight) | Number of Layers | Percent Reflectivity (550 nm) | Theoretical Reflectivity |
|---|---|---|---|---|
| 1 | 100/0 | 1857 | 65 | 66 |
| 2 | 60/40 | 657 | 73 | 58 |

EXAMPLE 4

The procedures and equipment described in the preceding examples were used to prepare a sheet of reflective polymeric body. The sheet was approximately 3.2 mm thick and had 2625 alternating layers of PMMA and 4,4'-thiodiphenol/bisphenol-A (TDP/BA) copolycarbonate (coPC). The coPC had a TDP/BA molar ratio of 3/1 and a refractive index of 1.636. BAPC was used to provide protective boundary layers and an outer skin layer. The refractive index mismatch ($\Delta n$) for the PMMA and TDP/BA coPC components was 0.141.

For comparison, the same procedure was used to prepare a reflective sheet with 2625 alternating layers of PMMA and BAPC and having a thickness of approximately 3.2 mm. The refractive index mismatch ($\Delta n$) for the PMMA and BAPC components was 0.095.

The reflectivity of these two sheets was determined as described hereinbefore. The data obtained is shown below.

| Sample | PC Type | $\Delta n$ | Percent Reflectivity | Theoretical Reflectivity |
|---|---|---|---|---|
| 1 | TDP/BA | 0.141 | 94 | 85 |
| 2 | BA | 0.095 | 72 | 73 |

Again, the results show that an increase in the refractive index mismatch ($\Delta n$) between the A and B components results in an increase in the reflectivity.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A reflective polymeric body of at least first and second diverse polymeric materials, the body comprising a sufficient number of alternating layers of said first and second polymeric materials such that at least 30% of light incident on said body is reflected, a substantial majority of the individual layers of said body having an optical thickness of not more than 0.09 micrometers or not less than 0.45 micrometers, with at least one of said individual layers having an optical thickness of not less than 0.45 micrometers, wherein said first and second polymeric materials differ from each other in refractive index by at least about 0.1, and wherein one of said first and second polymeric materials comprises a copolycarbonate of bisphenol-A and 4,4'-thiodiphenol 2. The reflective polymeric body of claim 1 wherein said copolycarbonate comprises from 5-80 mole percent 4,4'-thiodiphenol and from 95-20 mole percent bisphenol A.

3. The reflective polymeric body of claim 1 wherein said 4,4'-thiodiphenol is present in a mole ratio of about 3 to 1 relative to said bisphenol-A.

4. The reflective polymeric body of claim 1 wherein the other of said first and second polymeric materials preferably comprises a blend of polymethyl methacrylate and polyvinylidene fluoride.

5. The reflective polymeric body of claim 1 in which said body comprises at least 500 layers.

6. The reflective polymeric body of claim 1 in which said polymeric body is thermoformable.

7. The reflective polymeric body of claim 1 in which a coloring agent is incorporated into at least one layer of said polymeric body.

8. The reflective polymeric body of claim 7 in which said coloring agent is selected from the group consisting of pigments and dyes.

9. The reflective polymeric body of claim 8 in which said coloring agent is incorporated into at least one surface layer of said polymeric body.

10. The reflective polymeric body o claim 8 in which said coloring agent is incorporated into at least one interior layer of said polymeric body.

11. The reflective polymeric body of claim 1 in which at least one surface layer has a brushed or roughened surface.

12. The reflective polymeric body of claim 1 in which at least one surface layer has been etched to provide a matte or pewter finish.

13. The reflective polymeric body of claim 1 in which at least one surface layer has been embossed.

14. The reflective polymeric body of claim 1 in which at least one of said first and second polymeric materials are elastomers.

15. The reflective polymeric body of claim 1 in which at least 75% of said layers have an optical thickness of at least 0.45 micrometers.

16. The reflective polymeric body of claim 1 in which said body is extruded as a profile.

17. The reflective polymeric body of claim 16 in which said body is in the form of a tube.

18. The reflective polymeric body of claim 1 in which said body is post formed into a profile.

19. The reflective polymeric body of claim 1 in which said body is a blow-molded container.

20. The reflective polymeric body of claim 1 in which said polymeric body is in the form of a sheet having two major surfaces.

21. The reflective polymeric body of claim 20 in which said body includes a permanent protective skin layer on at least one major surface thereof.

22. The reflective polymeric body of claim 1 which includes a barrier layer as an exterior layer of said body.

23. A reflective polymeric body of at least first and second diverse polymeric materials, the body comprising a sufficient number of alternating layers of said first and second polymeric materials such that essentially no visibly perceived iridescence is reflected, a substantial majority of the individual layers of said body having an optical thickness of not more than 0.09 micrometers or not less than 0.45 micrometers, with at least one of said individual layers having an optical thickness of not less than 0.45 micrometers, wherein said first and second polymeric materials differ from each other in refractive index by at least about 0.1, and wherein one of said first and second polymeric materials comprises a copolycarbonate of bisphenol-A and 4,4'-thiodiphenol.

24. A mirror like polymeric article having at least first and second major surfaces, said article comprising a sufficient number of alternating layers of first and second polymeric materials such that at least 30% of light incident on said article is reflected, a substantial majority of the individual layers of said article having an optical thickness of not more than 0.09 micrometers or not less than 0.45 micrometers, with at least one of said individual layers having an optical thickness of not less than 0.45 micrometers, wherein said first and second polymeric materials differ from each other in refractive index by at least about 0.1, wherein one of said major surfaces includes a light absorbent layer, and wherein one of said first and second polymeric materials comprises a copolycarbonate of bisphenol-A and 4,4'-thiodiphenol.

25. A mirror like polymeric article having at least first and second major surfaces, said article comprising a sufficient number of alternating layers of first and second polymeric materials such that at least 30% of light incident on said article is reflected, and at least one interior light absorbing layer, a substantial majority of the individual layers of said article having an optical thickness of not more than 0.09 micrometers or not less than 0.45 micrometers, with at least one of said individual layers having an optical thickness of not less than 0.45 micrometers, wherein said first and second polymeric materials differ from each other in refractive index by at least about 0.1, and wherein one of said first and second polymeric materials comprises a copolycarbonate of bisphenol-A and 4,4'-thiodiphenol.

26. A birefringent light polarizer which reflects light anisotropically, comprising multiple layers of at least first and second diverse polymeric materials, a substantial majority of the individual layers of said polarizer having an optical thickness of not more than 0.09 micrometers or not less than 0.45 micrometers, wherein said first and second polymeric materials differ from each other in refractive index by at least about 0.1 in one plane of the polarizer, and wherein one of said first and second polymeric materials comprises a copolycarbonate of bisphenol-A and 4,4'-thiodiphenol.

27. The birefringent light polarizer of claim 26 in which the difference in refractive index between said first and second polymeric materials is caused by stretching said materials in a uniaxial direction to orient said polymeric materials.

28. A reflective polymeric body of at least first and second diverse polymeric materials, the body comprising a sufficient number of alternating layers of said first and second polymeric materials such that at least 30% of light incident on said body is reflected, a substantial majority of the individual layers of said body having an optical thickness of not more than 0.09 micrometers or not less than 0.45 micrometers, wherein said first and second polymeric materials differ from each other in refractive index by at least about 0.1 and wherein one of said first and second polymeric materials comprises a copolymer of methyl methacrylate and vinylidene fluoride or miscible blend of polymethyl methacrylate and polyvinylidene fluoride.

29. The reflective polymeric body of claim 28 wherein said blend comprises from 95-5 weight percent polymethyl methacrylate and from 5-95 weight percent polyvinylidene fluoride.

30. The reflective polymeric body of claim 28 wherein said copolymer comprises from 95-5 mole percent methyl methacrylate and from 5-95 mole percent vinylidene fluoride.

31. The reflective polymeric body of claim 28 wherein said polymethyl methacrylate is present in a weight ratio of about 1:1 relative to said polyvinylidene fluoride.

32. The reflective polymeric body of claim 28 wherein the other of said first and second polymeric materials comprise a bisphenol A polycarbonate or a copolycarbonate of thiodiphenol and bisphenol-A.

33. The reflective polymeric body of claim 28 wherein the other of said first and second polymeric materials comprises bisphenol-A polycarbonate.

34. The reflective polymeric body of claim 28 in which said body comprises at least 500 layers.

35. The reflective polymeric body of claim 28 in which said polymeric body is thermoformable.

36. The reflective polymeric body of claim 28 in which a coloring agent is incorporated into at least one layer of said polymeric body.

37. The reflective polymeric body of claim 36 in which said coloring agent is selected from the group consisting of pigments and dyes.

38. The reflective polymeric body of claim 37 in which said coloring agent is incorporated into at least one surface layer of said polymeric body.

39. The reflective polymeric body of claim 37 in which said coloring agent is incorporated into at least one interior layer of said polymeric body.

40. The reflective polymeric body of claim 28 in which at least one surface layer has a brushed or roughened surface.

41. The reflective polymeric body of claim 28 in which at least one surface layer has been etched to provide a matte or pewter finish.

42. The reflective polymeric body of claim 28 in which at least one surface layer has been embossed.

43. The reflective polymeric body of claim 28 in which said first and second polymeric materials are elastomers.

44. The reflective polymeric body of claim 28 in which at least 75% of said individual layers of said first polymeric material have an optical thickness of at least 0.45 micrometers.

45. The reflective polymeric body of claim 28 in which at least 75% of said individual layers of said first polymeric material have an optical thickness of 0.09 micrometers or less.

46. The reflective polymeric body of claim 28 in which said body is extruded as a profile.

47. The reflective polymeric body of claim 46 in which said body is in the form of a tube.

48. The reflective polymeric body of claim 28 in which said body is post formed into a profile.

49. The reflective polymeric body of claim 28 in which said body is a blow-molded container.

50. The reflective polymeric body of claim 28 in which said polymeric body is in the form of a sheet having two major surfaces.

51. The reflective polymeric body of claim 50 in which said body includes a permanent protective skin layer on at least one major surface thereof.

52. The reflective polymeric body of claim 28 which includes a barrier layer as an exterior layer of said body.

53. A reflective polymeric body of at least first and second diverse polymeric materials, the body comprising a sufficient number of alternating layers of said first and second polymeric materials such that at least 30% of light incident on said body is reflected, a substantial majority of the individual layers of said body having an optical thickness of not more than 0.09 micrometers or not less than 0.45 micrometers, with at least one of said individual layers having an optical thickness of not less than 0.45 micrometers, wherein said first and second polymeric materials differ from each other in refractive index by at least about 0.1 and wherein said first polymeric material comprises a blend of polymethyl methacrylate and a fluoropolymer, and wherein said fluoropolymer comprises a copolymer of vinylidene fluoride and a monomer selected from the group consisting of chlorofluoroethylene, chlorodifluoroethylene, chlorotrifluoroethylene, chlorotrifluoroethylene, hexafluoroacetone, hexafluoropropylene, hexafluoropropene, pentafluoropropylene, trifluoroethylene, tetrafluoroethylene, and vinyl fluoride.

54. The reflective polymeric body of claim 53 wherein said blend comprises from 95-5 weight percent polymethyl methacrylate and from 5-95 weight percent fluoropolymer.

55. The reflective polymeric body of claim 53 wherein said second polymeric material comprises a bisphenol A polycarbonate or a copolycarbonate of thiodiphenol and bisphenol-A.

56. A reflective polymeric body of at least first and second diverse polymeric materials, the body comprising a sufficient number of alternating layers of said first and second polymeric materials such that at least 30% of light incident on said body is reflected, a substantial majority of the individual layers of said body having an optical thickness of not more than 0.09 micrometers or not less than 0.45 micrometers, with at least one of said individual layers having an optical thickness of not less than 0.45 micrometers, wherein said first and second polymeric materials differ from each other in refractive index by at least about 0.1 and wherein one of said first and second polymeric materials comprises a copolymer of methyl methacrylate, vinylidene fluoride, and a fluorocarbon monomer selected from the group consisting of chlorofluoroethylene, chlorodifluoroethylene, chlorotrifluoroethylene, chlorotrifluoroethylene, hexafluoroacetone, hexafluoropropylene, hexafluoropropene, pentafluoropropylene, trifluoroethylene, tetrafluoroethylene, and vinyl fluoride.

57. The reflective polymeric body of claim 56 wherein said copolymer comprises from 90-10 mole percent polymethyl methacrylate, from 5-45 mole percent vinylidene fluoride, and from 5-45 mole percent fluorocarbon monomer.

58. The reflective polymeric body of claim 56 wherein the other of said first and second polymeric materials comprises a copolycarbonate of thiodiphenol and bisphenol-A.

59. A reflective polymeric body of at least first and second diverse polymeric materials, the body comprising a sufficient number of alternating layers of said first and second polymeric materials such that essentially no visibly perceived iridescence is reflected, a substantial majority of the individual layers of said body having an optical thickness of not more than 0.09 micrometers or not less than 0.45 micrometers, with at least one of said individual layers having an optical thickness of not less than 0.45 micrometers, wherein said first and second polymeric materials differ from each other in refractive index by at least about 0.1, and wherein one of said first and second polymeric materials comprises a copolymer of methyl methacrylate and vinylidene fluoride or a miscible blend of polymethyl methacrylate and polyvinylidene fluoride.

60. A mirror like polymeric article having at least first and second major surfaces, said article comprising a sufficient number of alternating layers of first and second polymeric materials such that at least 30% of light incident on said article is reflected, a substantial majority of the individual layers of said article having an optical thickness of at not more than 0.09 micrometers or not less than 0.45 micrometers, with at least one of said individual layers having an optical thickness of not less than 0.45 micrometers, wherein said first and second polymeric materials differ from each other in refractive index by at least about 0.1, wherein one of said major surfaces includes a light absorbent layer, and wherein one of said first and second polymeric materials comprises a copolymer of methyl methacrylate and vinylidene fluoride or miscible blend of polymethyl methacrylate and polyvinylidene fluoride.

61. A mirror like polymeric article having at least first and second major surfaces, said article comprising a sufficient number of alternating layers of first and second polymeric materials such that at least 30% of light incident on said article is reflected, and at least one interior light absorbing layer, a substantial majority of the individual layers of said article having an optical thickness of not more than 0.09 micrometers or not less than 0.45 micrometers, with at least one of said individual layers having an optical thickness of not less than 0.45 micrometers, wherein said first and second polymeric materials differ from each other in refractive index by at least about 0.1, and wherein one of said first and second polymeric material comprises a copolymer of methyl methacrylate and vinylidene fluoride or miscible blend of polymethyl methacrylate and polyvinylidene fluoride.

62. A birefringent light polarizer which reflects light anisotropically, comprising multiple layers of at least first and second diverse polymeric materials, a substantial majority of the individual layers of said polarizer having an optical thickness of not more than 0.09 micrometers or not less than 0.45 micrometers, with at least one of said individual layers having an optical thickness of not less than 0.45 micrometers, wherein said first and second polymeric materials differ from each other in refractive index by at least about 0.1 in one plane of the polarizer, and wherein one of said first and second polymeric materials comprises a copolymer of methyl methacrylate and vinylidene fluoride or a miscible blend of polymethyl methacrylate and polyvinylidene fluoride.

63. The birefringent light polarizer of claim 62 in which the difference in refractive index between said first and second polymeric materials is caused by stretching said materials in a uniaxial direction to orient said polymeric materials.

64. A reflective polymeric body of at least first and second diverse polymeric materials, the body comprising a sufficient number of alternating layers of said first and second polymeric materials such that at least 30% of light incident on said body is reflected, a substantial majority of the individual layers of said body having an optical thickness of not more than 0.09 micrometers or not less than 0.45 micrometers, with at least one of said individual layers having an optical thickness of not less than 0.45 micrometers, wherein said first and second polymeric materials differ from each other in refractive index by at least about 0.03 and wherein said first polymeric material comprises polymethyl methacrylate and said second polymeric material comprises a copolymer of methyl methacrylate and vinylidene fluoride or a miscible blend of polymethyl methacrylate and polyvinylidene fluoride.

65. The reflective polymeric body of claim 64 wherein said blend comprises from 0-60 weight percent polymethyl methacrylate and from 100-40 weight percent polyvinylidene fluoride.

66. The reflective polymeric body of claim 64 wherein said copolymer comprises from 0-60 mole percent methyl methacrylate and from 100-40 mole percent vinylidene fluoride.

67. A reflective polymeric body of at least first and second diverse polymeric materials, the body comprising a sufficient number of alternating layers of said first and second polymeric materials such that at least 30% of light incident on said body is reflected, a substantial majority of the individual layers of said body having an optical thickness of not more than 0.09 micrometers or not less than 0.45 micrometers, with at least one of said individual layers having an optical thickness of not less than 0.45 micrometers, wherein said first and second polymeric materials differ from each other in refractive index by at least about 0.03 and wherein said first polymeric material comprises polyvinylidene fluoride and said second polymeric material comprises a copolymer of methyl methacrylate and vinylidene fluoride or a miscible blend of polymethyl methacrylate and polyvinylidene fluoride.

68. The reflective polymeric body of claim 67 wherein said blend comprises from 100-45 weight percent polymethyl methacrylate and from 0-55 weight percent polyvinylidene fluoride.

69. The reflective polymeric body of claim 67 wherein said copolymer comprises from 100-45 mole percent methyl methacrylate and from 0-55 mole percent vinylidene fluoride.

70. A reflective polymeric body of at least first and second diverse polymeric materials, the body comprising a sufficient number of alternating layers of said first and second polymeric materials such that at least 30% of light incident on said body is reflected, a substantial majority of the individual layers of said body having an optical thickness of not more than 0.09 micrometers or not less than 0.45 micrometers, with at least one of said individual layers having an optical thickness of not less than 0.45 micrometers, wherein said first and second polymeric materials differ from each other in refractive index by at least about 0.03 and wherein said first polymeric material comprises polymethyl methacrylate and said second polymeric material comprises a copolymer of methyl methacrylate, vinylidene fluoride, and a fluorocarbon monomer selected from the group consisting of chlorofluoroethylene, chlorodifluoroethylene, chlorotrifluoroethylene, chlorotrifluoroethylene, hexafluoroacetone, hexafluoropropylene, hexafluoropropene, pentafluoropropylene, trifluoroethylene, tetrafluoroethylene, and vinyl fluoride.

71. The reflective polymeric body of claim 70 wherein said copolymer comprises from 0-80 mole percent methyl methacrylate, from 60-10 mole percent vinylidene fluoride, and from 40-10 mole percent fluorocarbon monomer.

* * * * *